(12) United States Patent
Kabrich

(10) Patent No.: US 8,489,297 B2
(45) Date of Patent: *Jul. 16, 2013

(54) CLUTCH HOLD LEVEL AS A FUNCTION OF TORQUE

(75) Inventor: Todd R. Kabrich, Mapleton, IL (US)

(73) Assignee: Caterpillar Inc., Peoria, IL (US)

( * ) Notice: Subject to any disclaimer, the term of this patent is extended or adjusted under 35 U.S.C. 154(b) by 1013 days.

This patent is subject to a terminal disclaimer.

(21) Appl. No.: 12/423,940

(22) Filed: Apr. 15, 2009

(65) Prior Publication Data

US 2010/0268427 A1 Oct. 21, 2010

(51) Int. Cl.
*G06F 7/00* (2006.01)
*G06F 17/00* (2006.01)
*G06F 19/00* (2011.01)

(52) U.S. Cl.
USPC ............................................................ 701/67

(58) Field of Classification Search
USPC ................... 192/3.51; 701/67, 68; 477/8–14, 477/39, 57, 62–65, 70, 77–81, 83, 86, 166, 477/174–176, 180
See application file for complete search history.

(56) References Cited

U.S. PATENT DOCUMENTS

| | | | |
|---|---|---|---|
| 5,272,630 A | 12/1993 | Brown et al. | |
| 5,580,332 A * | 12/1996 | Mitchell et al. | 477/143 |
| 5,655,996 A | 8/1997 | Ohtsuka | |
| 5,737,979 A | 4/1998 | McKenzie et al. | |
| 6,090,011 A | 7/2000 | Minowa et al. | |
| 6,199,450 B1 | 3/2001 | Carlson et al. | |
| 6,319,170 B1 * | 11/2001 | Hubbard et al. | 477/107 |
| 6,385,520 B1 | 5/2002 | Jain et al. | |
| H2031 H | 6/2002 | Harrell et al. | |
| 6,514,166 B2 | 2/2003 | Yuasa et al. | |
| 6,564,915 B2 * | 5/2003 | Lorentz et al. | 192/3.58 |
| 6,633,805 B2 | 10/2003 | Burgart et al. | |
| 6,991,585 B2 | 1/2006 | Colvin et al. | |
| 7,066,862 B2 * | 6/2006 | Bothe et al. | 477/143 |
| 7,292,922 B2 | 11/2007 | Chen et al. | |
| 7,331,899 B2 | 2/2008 | Ortmann et al. | |
| 7,349,785 B2 | 3/2008 | Lee et al. | |
| 7,353,725 B2 | 4/2008 | Kabrich et al. | |
| 7,909,733 B2 * | 3/2011 | Imediegwu | 477/143 |
| 2002/0120381 A1 * | 8/2002 | Jeon | 701/51 |
| 2004/0092365 A1 * | 5/2004 | Kwon et al. | 477/143 |
| 2006/0219509 A1 | 10/2006 | Kabrich et al. | |
| 2007/0287582 A1 * | 12/2007 | Steinhauser et al. | 477/71 |
| 2008/0194384 A1 | 8/2008 | League et al. | |

* cited by examiner

*Primary Examiner* — Jeffrey Shapiro
(74) *Attorney, Agent, or Firm* — Leydig, Voit & Mayer

(57) ABSTRACT

A system and method for controlling a hydraulic transmission uses a clutch fill profile having a hold level that varies as a function of torque. A pressure required for an on-coming clutch to hold the gear of the off-going clutch without a flare or over-speed condition is calculated. This pressure approximates the pressure of the on-coming clutch when a disengage command with respect to the off-going clutch is reached. The pulse and hold phases for the clutch are executed at times that are constant from shift to shift and do not vary as a function of torque or slip.

20 Claims, 5 Drawing Sheets

CLUTCH HOLD LEVEL AS A FUNCTION OF TORQUE

TECHNICAL FIELD

This disclosure relates generally to systems and methods for enabling robust clutch control and, more particularly, to systems and methods for controlling a hold level of a pressurized operating medium as a function of torque within a clutch-controlled transmission.

BACKGROUND

Transmissions typically include an input shaft, an output shaft, and a collection of interrelated gear elements, such as in a planetary arrangement or otherwise. These elements are used to selectively couple the input shaft and the output shaft. Hydraulic clutches are also well known, and can be found in many systems and devices. In one implementation, a set or a plurality of hydraulic clutches facilitates shifting of a transmission between differing input/output gear ratios or ratio ranges. The clutches are used to select gear ratios in a discrete transmission, and to select gear ratio ranges in a continuous transmission. Both types of coupling are referred to herein as "ratios."

Selection of a gear ratio at the output shaft is executed through one or more clutches that affect the rotations and/or interrelationships of the gear elements. The clutches are typically hydraulically actuated to engage band or disk torque transfer elements. Shifting from one gear ratio to another typically involves releasing or disengaging an off-going clutch or clutches associated with a current gear ratio and applying or engaging an on-coming clutch or clutches associated with the desired gear ratio. Although different clutch arrangements may be provided within such transmissions, one arrangement is a "two-clutch" shifting transmission. In this arrangement, the two clutches for each gear include a primary clutch, often a rotating clutch element, which is retained for an upcoming gear, and a secondary clutch that is disengaged in order to shift into the upcoming gear. The secondary clutch for this shift condition is often referred to as the off-going clutch. This clutch is replaced by a new clutch, namely the "on-coming" clutch, that actuates the transmission into the new gear. In other words, a shift is executed by deactivating a single "off-going" clutch, activating a single "on-coming" clutch, and in some cases holding a third clutch for both the old and new gears. In other arrangements, multiple on-coming and\or off-going clutches are employed, increasing the complexity and criticality of clutch actuation timing.

Each hydraulic clutch in these arrangements is typically driven through an electrically controlled solenoid valve. Each of the solenoid valves is modulated through the application of an electrical control signal to control hydraulic fluid pressure applied to the clutch and, as a result, to control a clutch piston movement during various phases corresponding to a shift.

The manner in which phasing of the on-coming and off-going clutch element occurs can have a substantial impact on the perceived shift quality. For example, if the off-going clutch disengages prematurely, the engine speed may surge briefly before the on-coming clutch, if still in a fill phase, possesses sufficient torque capacity. If the on-coming clutch fills prematurely, the clutch element has significant torque capacity prematurely, i.e., before the off-going clutch is ready to commence torque transfer. This often results in a three-way clutch tie up which is detrimental to the transmission's useful life in a mild case, and which can result in mechanical damage to the transmission in a more severe case.

On the other hand, in the event of a late clutch fill, the off-going clutch attempts to hand off torque to the on-coming clutch before the on-coming clutch has sufficient torque capacity. As a result, the transmission slips as the on-coming clutch fails to lock with adequate torque capacity to hold the specific gear in question. The end result is a slip phenomenon in the clutch discs, also an undesirable event as this tends to produce high clutch energies resulting from excessive heat generation produced by the higher clutch relative velocities of the rotating clutch discs.

In addition to creating an unpleasant user experience, improperly timed shifting will adversely impact the efficiency and service life of the transmission. To this end, it is desirable to actuate the clutches with precision such that a smooth shift occurs throughout the entire operating speed range of the transmission during its entire useful life.

Known methods for providing a control strategy to exchange or "hand-off" clutches in an electronic control power transmission include a dual control, time-based strategy. That is, the clutch fill time in which the on-coming clutch transitions from a hold phase to a modulation phase is matched with the off-going clutch as a function of the timing of various clutch events. This control strategy is based upon the determination of the on-coming pressure at release, the clutch unlock pressure and an on-coming clutch pressure past release. While this control strategy generally produces acceptable shift quality, it is often somewhat difficult to tune due to the many variables that must be simultaneously considered and balanced in performing the clutch hand-off. When such parameters are not adequately addressed, the transition may result in a degradation of shift quality.

SUMMARY

In one aspect, the disclosure relates to a method of controlling a transmission having a plurality of hydraulic clutches for shifting between one or more transmission ratios. The method includes determining to execute a shift of the transmission between a first ratio associated with an off-going hydraulic clutch of the transmission, which is currently engaged, and a second ratio associated with an on-coming hydraulic clutch of the transmission, which is currently disengaged. A decrease of hydraulic pressure is commanded to the off-going hydraulic clutch to begin disengagement of the off-going hydraulic clutch. A hold level command for the on-coming clutch is calculated based upon a torque experienced by the transmission during the shift of the transmission, and a sequence of clutch phases is commanded, with respect to the on-coming clutch, to occur at predetermined times regardless of the torque experienced by the transmission during the shift of the transmission. Such sequence of clutch phases includes a pulse phase, a hold phase that includes applying the calculated hold level command to the on-coming clutch, and a modulation phase to fully engage the on-coming hydraulic clutch.

In another aspect, the disclosure describes a hydraulic clutch control system for a hydraulic transmission. The control system includes an off-going clutch disposed to engage a first ratio of the transmission, and an on-coming clutch disposed to engage a second ratio of the transmission. A first electro-hydraulic control valve is associated with the off-going clutch and a second electro-hydraulic control valve is associated with the on-coming clutch. A clutch controller is operably associated with the first and second electro-hydraulic control valves. The clutch controller is disposed to determine an execution of a shift of the transmission between the first ratio and the second ratio when the first ratio is engaged, and command a decrease of hydraulic pressure to the off-going clutch to begin disengagement of the off-going hydraulic clutch from the first ratio. The clutch controller is further disposed to calculate a hold level command for the on-coming clutch based upon a torque experienced by the transmission during the shift of the transmission and command, with respect to the on-coming clutch, a sequence of clutch phases to occur at predetermined times regardless of the torque experienced by the transmission during the shift of the transmission. The sequence of clutch phases includes a pulse phase, a hold phase that includes applying the calculated hold level command to the on-coming clutch, and a modulation phase to fully engage the on-coming hydraulic clutch.

In yet a further aspect, the disclosure describes a computer-readable medium having thereon computer-executable instructions for shifting between one or more transmission ratios within a transmission having a plurality of hydraulic clutches. The computer-executable instructions include instructions for determining to execute a shift of the transmission between a first ratio associated with an off-going hydraulic clutch of the transmission, which is currently engaged, and a second ratio associated with an on-coming hydraulic clutch of the transmission, which is currently disengaged. Instructions for commanding a decrease of hydraulic pressure to the off-going hydraulic clutch to begin disengagement of the off-going hydraulic clutch, and instructions for calculating a hold level command for the on-coming clutch based upon a torque experienced by the transmission during the shift of the transmission are executed. Thereafter, instructions are executed for commanding, with respect to the on-coming clutch, a sequence of clutch phases to occur at predetermined times regardless of the torque experienced by the transmission during the shift of the transmission. Such sequence of clutch phases includes a pulse phase, a hold phase that includes instructions for applying the calculated hold level command to the on-coming clutch, and a modulation phase to fully engage the on-coming hydraulic clutch.

DETAILED DESCRIPTION

This disclosure generally relates to transmissions that employ hydraulic clutches to control transmission ratio or range shifts. The disclosed principles provide a simplified control strategy for controlling a hand-off between at least two clutches. Specifically, a fill event of the an on-coming clutch is at least partially determined as a function of torque. This simplified control strategy is capable of providing improved shift quality.

Figure 1:
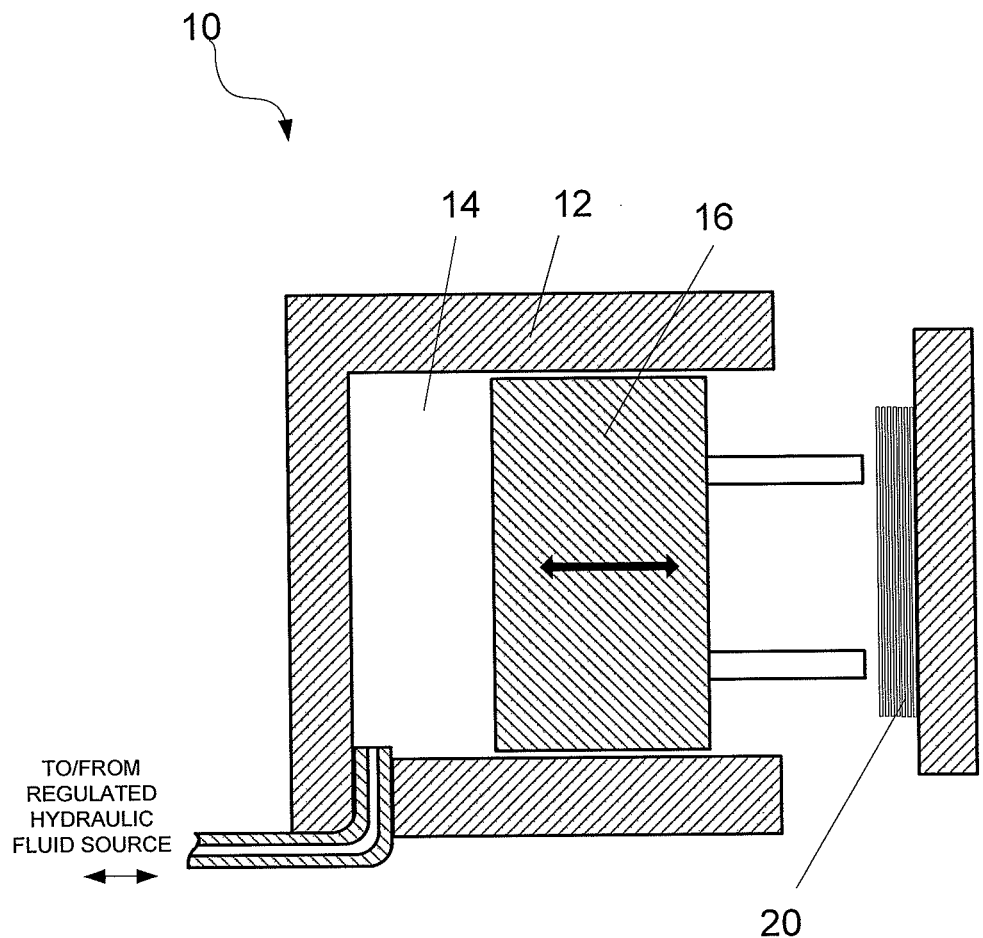
FIG. 1 is a schematic cross-sectional view of a hydraulic clutch controllable in accordance with the disclosed principles.

FIG. 1 is a simplified schematic view of a hydraulic clutch 10 that may employ the disclosed principles. The hydraulic clutch 10 comprises a cylinder 12 that at least partially defines a fill chamber 14 disposed to retain hydraulic fluid. The fill chamber 14 also contains a cooperating fitted piston 16 or other movable member that is capable of transmitting fluid pressure from the piston 16 to a friction member 20. In an illustrated embodiment, the friction member includes a stack of clutch plates. When the fluid volume within the fill chamber 14 reaches a level sufficient to urge the friction member 20 into a final position, e.g., such that the stack of clutch plates fully engages interleaved transfer elements (not shown), the clutch 10 is said to be "filled." In an embodiment, the piston 16 may move a relatively small distance, e.g., about 4 mm, between the empty and filled state of the clutch 10.

Once the clutch 10 is filled, a continued introduction of fluid into the fill chamber 14 tends to increase the pressure within the fill chamber 14. This increased pressure translates into an increased force applied by the fluid to the piston 16, and a corresponding increased frictional force between the friction member 20 and its counterpart, e.g., the interleaved transfer elements. At a certain pressure level, which may be unique to the clutch 10, the friction between the between the friction member 20 and its counterpart fully overcomes the resistance of a load attached to the counterpart, e.g., a machine transmission or the like. In this state, the clutch 10 is "locked" so that the friction member 20 and its counterpart move together and torque is transferred via the clutch 10.

At the beginning of a clutch shift, a clutch command signal in the form of a command pulse is applied at a relatively high level for a discrete period of time. This phase is known as the "pulse phase." During this phase, the pulse applied to the solenoid valve is sufficient to open the control valve to permit filling of the fluid actuated clutch, thereby stroking the actuated clutch piston. The fluid actuated clutch command signal is then decreased to a hold level during a hold time that is sufficient to completely fill the fluid actuated clutch. The hold level may be applied from the pulse level via a transition of a brief downward command ramping signal. After the fluid actuated clutch is filled, the clutch pressure enters a modulation phase via an application of an appropriate modulation signal. The modulation phase can utilize either open loop or closed loop control to gradually increase the clutch pressure to cause a desired decrease in clutch slip. The pressure within the clutch is increased and held at a level sufficient to maintain the clutch in its fully engaged position.

Many different clutch configurations may be used to implement the disclosed principles, and the foregoing description describes but one such configuration. Despite variations in configuration, most such clutches will have several common aspects including: (1) a small amount of dead space that is taken up by filling the clutch in a pulse phase before torque-transmitting elements initially come into contact with each other; and (2) a pressure dependent torque-carrying capacity. In accordance with the disclosed principles, an on-coming clutch meeting these criteria is filled, held and then modulated in accordance with a single clutch hold-level-based control scheme. In this way, the control strategy effectively eliminates the need to execute dual clutch time-based control.

Figure 2:
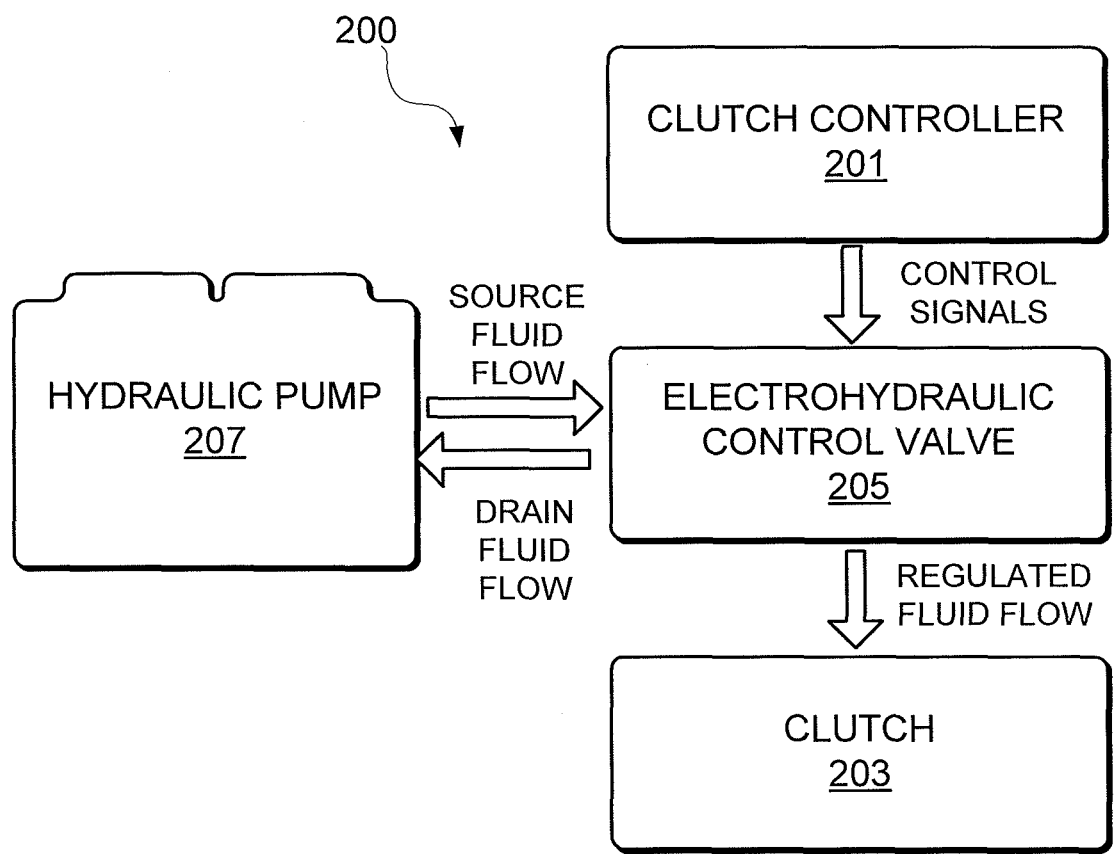
FIG. 2 is a schematic diagram of a hydraulic clutch control system in accordance with the disclosed principles.

Although the control system used to manage the clutch hand-off during shifting may vary in particular implementation details, FIG. 2 is a schematic illustration of an exemplary control architecture and environment 200. The exemplary control architecture and environment 200 includes a clutch controller 201 which, in the illustrated embodiment, is a dedicated clutch controller. Alternatively, the clutch controller 201 may be implemented as a function block or module within an engine and/or transmission controller or as a functional part of an overall system control.

The clutch controller 201 actuates a clutch 203 via an electro-hydraulic control valve 205, sometimes referred to as a solenoid valve. In the illustrated embodiment, the electro-hydraulic control valve 205 is a proportional valve that opens or closes in an amount that is proportional to an applied command signal. Typically, the command signal is an analog current signal, but it may alternatively be a voltage signal, and may be multi-level, pulse encoded, etc. In the alternative, the signal applied to the electro-hydraulic control valve may be a digital signal with appropriate modification. As the electro-hydraulic control valve 205 is actuated by a control signal, it allows a corresponding greater or lesser flow of pressurized hydraulic fluid to pass therethrough. Typically, the pressurized hydraulic fluid is supplied at a known pressure and flow rate by a hydraulic pump 207, as schematically shown in FIG. 2.

As was noted above, the timing at which clutches lock and unlock in a multi-clutch transmission is significant. For example, if an on-coming clutch locks before an off-going clutch unlocks, severe damage to the transmission or machine may result. Even if damage is avoided, the machine operator may nonetheless experience rough shifting and discomfort.

While the on-coming clutch undergoes the above actuation cycle, the corresponding off-going clutch is undergoing a de-actuation cycle, which may be viewed as an inverse process. That is, the pressure applied to the off-going clutch is gradually decreased such that the clutch "unlocks." This process continues until the clutch eventually completely disengages. An ideal torque hand-off can be characterized by a lack of engine "flare" (due to delayed on-coming lock-up) and a lack of clutch tie-up (due to premature on-coming lock-up). In other words, it is desirable that the on-coming clutch and off-going clutch "hand off" torque transfer responsibilities without a disruption in overall torque transfer through the transmission.

Typically, the continuity of torque transfer through the transmission is managed by carefully controlling the timing of the start of the modulation phase. That is, the timing of the clutch control signal at the end of the hold phase of the on-coming clutch is cooperatively managed with respect to the timing of the off-going clutch control signals. Thus, in cases in which the transmission must couple a substantial amount of torque, e.g., due to a sudden increase in load or engine output, the onset of the modulation phase for the on-coming clutch is delayed for a period commensurate with the increase in torque. In addition, the decoupling of the off-going clutch may also be delayed in a controlled manner. Thus, the hand-off in such cases may present a complicated control scheme because it requires a solution having multiple variables and time periods. In addition, shifts executed under increased torque loads will take substantially longer to complete.

Figure 3:
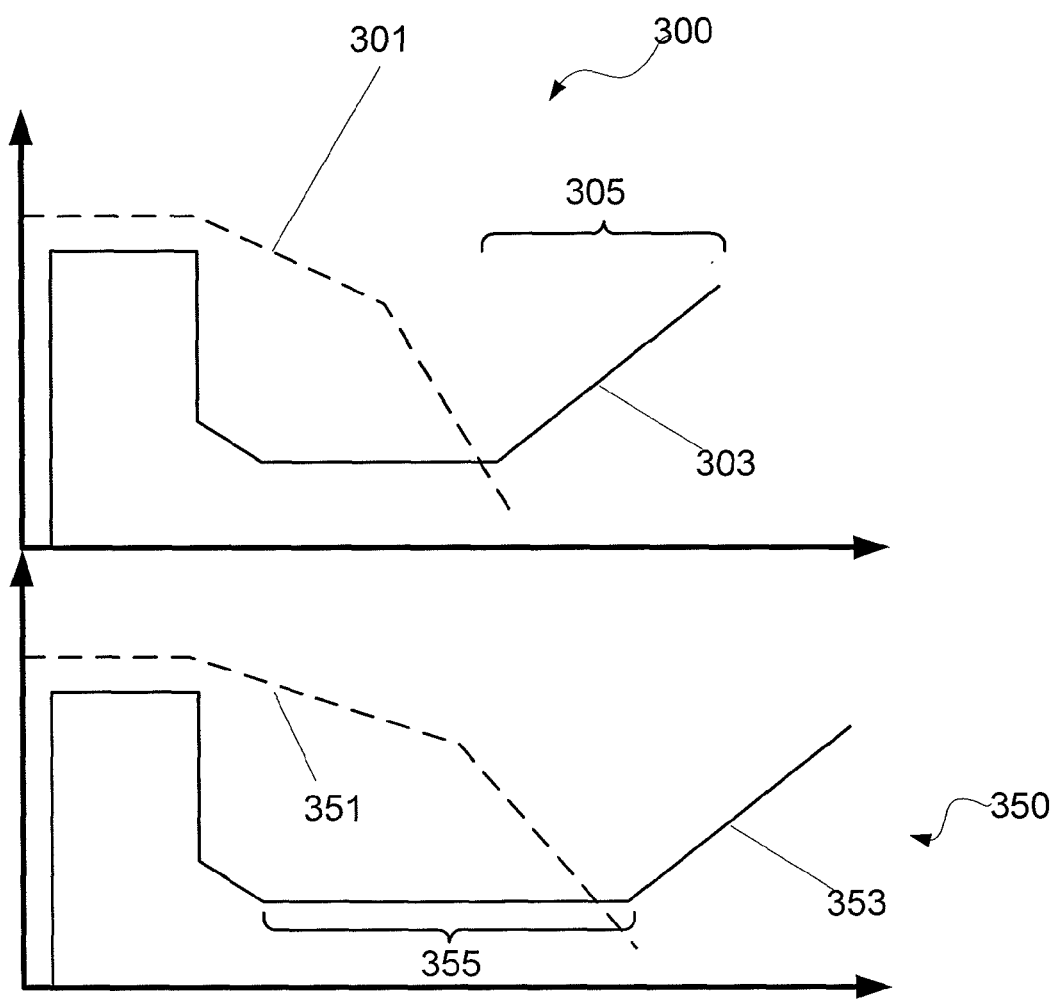
FIG. 3 is a graphical representation of the command values and timing in a time-based clutch control scheme.

Generic timing diagrams illustrating the use of time delays during high-torque shifts are shown in FIG. 3. A first timing diagram 300 illustrates two solenoid control curves. The first solenoid control curve 301 (represented by a dashed line) represents the control of the off-going clutch. The second solenoid control curve 303 (denoted by a solid line) represents the control of the on-coming clutch. The control curves 301, 303 depict clutch control as generally described above, with a monotonic stepped decrease in the off-going clutch pressure. At the same time, an essentially three-phase regimen is applied for the on-coming clutch pressure, beginning with an initial pulse phase, a clutch fill phase, and ending in a modulation phase 305. Although the exact contours of the modulation phase may be optimized in each implementation, an example modulation technique is taught in U.S. Pat. No. 7,353,725.

The second timing diagram 350 illustrated in FIG. 3 is provided on the same time-scale as the first timing diagram 300 to illustrate the conventional control scheme. In particular, the second timing diagram 350 shows conventional shift execution under a condition requiring increased torque. As can be seen, the high-torque off-going control curve 351 (denoted by a dashed line) is extended relative to the first solenoid control curve 301. Likewise, the high-torque on-coming control curve 353 (denoted by a solid line) is extended relative to the second solenoid control curve 303. Specifically, the second solenoid control curve 303 has been modified by extension of a hold phase 355 to accommodate the increase in torque before beginning the modulation phase. From this overview, it can be appreciated that conventional clutch hand-off control requires the precise manipulation of multiple mutually interdependent torque values with respect to both the off-going and the on-coming clutch.

Figure 4:
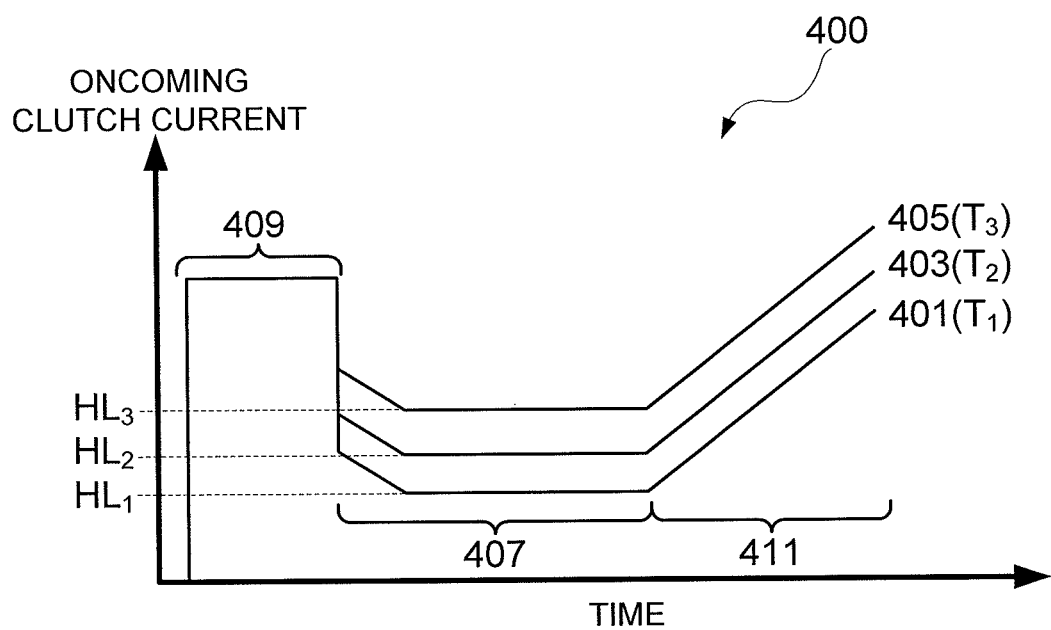
FIG. 4 illustrates a graphical representation of clutch fill parameters that are varied in magnitude as a function of torque according to the disclosed principles.

FIG. 4 illustrates a timing diagram 400 of overlapped on-coming clutch control curves for several different torque levels according to the novel hand-off control strategy described herein. In particular, three different on-coming clutch actuation curves 401, 403, and 405 that correspond to different torque values $T_1$, $T_2$, and $T_3$, respectively, are shown. The off-going clutch timing and levels will be the same regardless of torque. Accordingly, the off-going clutch timing and levels are not shown in FIG. 4 for convenience.

The torque values $T_1$, $T_2$, and $T_3$ indicate the level of torque that must be coupled through the transmission and may be measured in any conventional manner. For example, torque values measured outside of the transmission may be converted into the appropriate torque values based on the targeted or prior transmission ratio and the measured input and output speeds. Alternatively, the required torque values may be measured by another means as desired. Of course, other torque values may alternatively be utilized, such as an estimated torque or desired torque that is to be coupled through the transmission.

From shift to shift, as the torque that must be coupled through the transmission increases, the applied solenoid control current is modified in the hold phase 407. In this way, the timing and magnitude of the pulse phase 409 remains unchanged. Likewise, the timing of the modulation phase 411 remains unchanged. In particular, the value of the solenoid control current in the hold phase 407 is increased as a function of the torque that must be coupled through the transmission, with higher torque values resulting in higher hold level values. The relationship between torque and hold level may be implemented via a hold level/torque look-up table that is either obtained through experimental results or as defined by a hold level/torque algorithm. In an embodiment, a hold level algorithm may be used to establish hold levels that are related to the required torque through a linear equation. The relationship between hold level and torque may alternatively be established through the application of a nonlinear or more complicated relationship. In short, the relationship between hold level and torque will generally be monotonic, but need not necessarily be continuous or linear over an entire operating range of torques that will be transmitted by the transmission.

In a particular embodiment, the hold level is implemented as a linear function of torque. In this embodiment, the hold level is calculated according to the linear relationship $H=sT+o$, where H is the hold level and T is a torque value associated with the torque experienced by one or more clutches involved in the shift. The slope value s may be empirically or experimentally derived based upon data values obtained at low and high torque shifts. The offset value or constant o may correspond to the pressure needed to overcome the retraction spring force in the clutch.

In the illustrated example of FIG. 4, the torque value $T_1$ is less than the torque value $T_2$ which, in turn, is less than the torque value $T_3$. The corresponding hold levels $HL_1$, $HL_2$, and $HL_3$ similarly correspond to the varying torque levels, with $HL_1 < HL_2 < HL_3$. In this way, as the torque through the transmission increases or decreases from shift to shift, the ability of the clutch to transmit torque during the hold phase 407 increases or decreases as well. This control scheme permits the modulation phase 411 to begin at essentially the same time regardless of the torque value. It will be appreciated that although the timing of the modulation phase 411 remains unchanged for different values of torque, the current level during the modulation phase is altered during much of this phase by the same amount as the hold level. This difference ceases once the current reaches a maximum level during the modulation phase 411.

As noted above with reference to FIG. 2, a clutch controller 201, which may be a stand-alone module or a portion of an existing controller, contains appropriate program instructions to carry out control of the off-going and on-coming clutches during a shift event. It will be appreciated that the clutch controller 201 is a computing device, or is implemented by one or more computing devices, that includes a processor for executing computer-readable instructions, e.g., program code. The processor may be disposed to execute such instructions in conjunction with obtaining and/or processing other computer-readable data, e.g., clutch parameters, torque values, etc. The computer-readable instructions are stored temporarily or permanently on a computer-readable medium, e.g., an optical or magnetic memory, flash memory, etc. either formed as part of, or obtainable by, the clutch controller 201.

Figure 5:
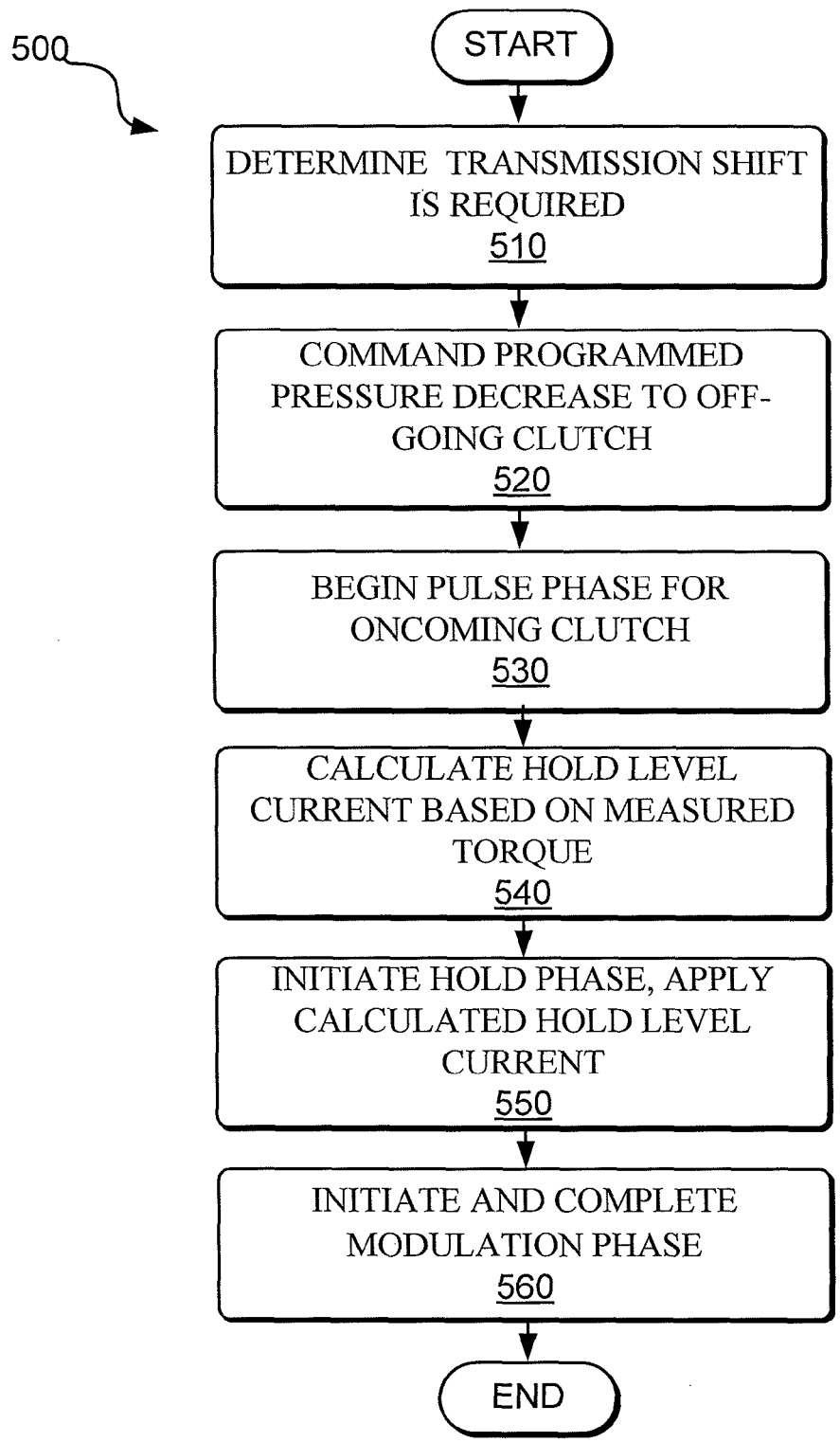
FIG. 5 is a flow chart illustrating a process of a controlling a hydraulic clutch in accordance with the disclosed principles.

The flow chart of FIG. 5 illustrates an exemplary process 500 for providing a clutch management control strategy, in accordance with the principles described above. For purposes of describing the process 500, it will be assumed that the system architecture is as described in FIGS. 1 and 2. Further, it is assumed that the process 500 is executed by the clutch controller 201. It will also be assumed that the shift under discussion is a two-clutch shift. However, these assumptions are made merely for ease of understanding the accompanying description. They should not be viewed as a required condition for all embodiments.

At stage 510 of the process 500, the clutch controller 201 determines that a transmission shift is required. The controller 201 may determine this requirement as a result of changing machine operating conditions such as increasing or decreasing machine speed and/or load. Alternatively, operator action, such as increased or decreased use of auxiliary devices, etc., may require a transmission shift. The clutch controller 201 commands a hydraulic pressure decrease to an off-going clutch associated with the current transmission ratio at stage 520. It should be understood that such a command is provided through an application of a command signal to an appropriate electro-hydraulic control valve (not shown) that is used in conjunction with the off-going clutch. Though illustrated as a discrete step, this stage will usually continue in parallel with several subsequent steps, as explained above in connection with FIGS. 3 and 4.

At stage 530, which begins at a predetermined time relative to (before, at, or after) the commencement of stage 520, the clutch controller 201 applies a pulse phase for the on-coming clutch 203 associated with a new desired transmission ratio.

In an embodiment, the pulse phase comprises providing a command signal for applying a predetermined pulse pressure via the electro-hydraulic control valve 205. The pulse phase lasts for a predetermined duration. At stage 540, which may occur in parallel with and/or prior to stage 530, the clutch controller 201 obtains data corresponding to a measured torque being transferred through the transmission. The clutch controller 201 operates in a logical fashion to calculate a hold level current based upon the data corresponding to measured torque. As discussed previously, the hold level current may be calculated by way of a table, e.g., an empirical look-up table relating torque and hold level current, or based upon the execution of an algorithm or equation that relates an appropriate hold level to the measured torque.

At the end of the pulse phase, the clutch controller 201 initiates the hold phase in stage 550, which includes applying the calculated hold level current to the electro-hydraulic control valve 205. The calculated hold level current is generally substantially less than the pulse level current, and the hold phase may begin by a direct drop from the pulse level current or, more suitably, by a partial drop followed by a small linear ramp to the hold level current. The hold phase lasts for a predetermined period that is independent of the measured torque. Of course, as explained above, the hold level itself varies as a function of the measured torque.

At stage 560, which begins after the predetermined period of the hold phase has expired, the clutch controller 201 initiates and subsequently completes the modulation phase. In this phase, the clutch controller 201 slowly increases the current to the electro-hydraulic control valve 205 as a predetermined function of time, beginning at the hold level current. In this way, the command signal applied to the electro-hydraulic control valve is eventually sufficient to lock up the on-coming clutch 203.

INDUSTRIAL APPLICABILITY

The present disclosure is applicable to hydraulic transmissions, that is, transmissions that employ hydraulic clutches to control the timing of transmission ratio or range shifts. In particular, the disclosed principles provide a mechanism for configuring and controlling a transmission so that during a shift, an on-coming clutch is actuated through different phases (pulse, hold, modulation) for a particular duration regardless of torque. That is, the pulse and hold phases for the clutch are executed at times that are constant from shift to shift and do not vary as a function of torque or slip. The hold level itself, however, is shifted as a function of torque. This simplified control technique eliminates the need to precisely time certain transitions to account for changing torque loads on the transmission. This system may be implemented in on-highway or off-highway machines, construction machines, industrial machines, and the like. Although many machines that may benefit from the disclosed principles will be machines used at least occasionally for transport of goods, materials, or personnel, it will be appreciated that hydraulic transmissions are used in other contexts as well, and the disclosed teachings are likewise broadly applicable.

Using the disclosed principles, a clutch controller 201, e.g., an ECM, may account for varying torque loads without varying the timing of clutch phase transitions. This eliminates computational complexity and also enables more efficient shifting. In one aspect, the disclosed system times the onset of the various clutch phases without regard to torque, but sets the clutch hold level current based upon torque, with higher torque values generating higher hold level current values. The disclosed principles, therefore, avoid a clutch control strategy based upon the timing of multiple variables. That is, the time in which the on-coming clutch transitions from a hold phase to a modulation phase is the same from shift to shift, and only the hold level current is adjusted as a function of torque.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A method of controlling a transmission having a plurality of hydraulic clutches for shifting between one or more transmission ratios, the method comprising:
    determining in a transmission controller to execute a shift of the transmission between a first ratio associated with an off-going hydraulic clutch of the transmission, which is currently engaged, and a second ratio associated with an on-coming hydraulic clutch of the transmission, which is currently disengaged;
    commanding via the transmission controller a decrease of hydraulic pressure to the off-going hydraulic clutch to begin disengagement of the off-going hydraulic clutch;
    calculating in the transmission controller a hold level command for the on-coming hydraulic clutch based upon a torque experienced by the transmission during the shift of the transmission; and
    commanding via the transmission controller, with respect to the on-coming hydraulic clutch, a sequence of clutch phases to occur at predetermined times regardless of the torque experienced by the transmission during the shift of the transmission, the sequence of clutch phases including a pulse phase, a hold phase that includes applying the calculated hold level command to the on-coming hydraulic clutch, and a modulation phase to fully engage the on-coming hydraulic clutch.

2. The method according to claim 1, wherein the transmission further includes an additional clutch other than the off-going hydraulic clutch and the on-coming hydraulic clutch, wherein the additional clutch is engaged for both the first ratio and the second ratio.

3. The method according to claim 1, wherein the transmission further includes a plurality of electro-hydraulic clutch pressure control valves determined by the number of clutches in the transmission, the valves having a supply side fluid circuit linked to a hydraulic fluid source and a control side fluid circuit linked to a clutch chamber of the on-coming hydraulic clutch.

4. The method according to claim 1, wherein the calculating step includes performing a table look-up in the transmission controller to determine the hold level command.

5. The method according to claim 1, wherein the calculating step includes executing an algorithm in the transmission controller that relates hold levels to the torque experienced by the transmission during the shift of the transmission.

6. The method according to claim 1, wherein the calculating step includes increasing the hold level as the torque experienced by the transmission during the shift of the transmission increases.

7. The method according to claim 6, wherein the calculating step includes decreasing the hold level as the torque experienced by the transmission during the shift of the transmission decreases.

8. The method according to claim 7, wherein the relationship between changes in the hold level and changes in the torque experienced by the transmission during the shift of the transmission is substantially linear.

9. The method according to claim 1 further including the steps of:
    calculating a modulation level command for the on-coming hydraulic clutch based upon a torque experienced by the transmission during the shift of the transmission; and
    applying the modulation level command for the on-coming hydraulic clutch during the modulation phase.

10. The method according to claim 9, wherein the calculating a modulation level command step includes increasing the modulation level as the torque experienced by the transmission during the shift of the transmission increases.

11. The method according to claim 10, wherein the calculating a modulation level step includes decreasing the modulation level as the torque experienced by the transmission during the shift of the transmission decreases.

12. A hydraulic clutch control system for a transmission, comprising:
    an off-going clutch disposed to engage a first ratio of the transmission;
    an on-coming clutch disposed to engage a second ratio of the transmission;
    a first electro-hydraulic control valve associated with the off-going clutch;
    a second electro-hydraulic control valve associated with the on-coming clutch; and
    a clutch controller operably associated with the first and second electro-hydraulic control valves, wherein the clutch controller is disposed to:
        determine an execution of a shift of the transmission between the first ratio and the second ratio when the first ratio is engaged;
        command a decrease of hydraulic pressure to the off-going clutch to begin disengagement of the off-going clutch from the first ratio;
        calculate a hold level command for the on-coming clutch based upon a torque experienced by the transmission during the shift of the transmission; and
        command, with respect to the on-coming clutch, a sequence of clutch phases to occur at predetermined times regardless of the torque experienced by the transmission during the shift of the transmission, the sequence of clutch phases including a pulse phase, a hold phase that includes applying the calculated hold level command to the on-coming clutch, and a modulation phase to fully engage the on-coming clutch.

13. The hydraulic clutch control system according to claim 12, wherein the transmission further includes an additional clutch other than the off-going clutch and the on-coming clutch, wherein the additional clutch is engaged for both the first ratio and the second ratio.

14. The hydraulic clutch control system according to claim 12, wherein each of the first and second electro-hydraulic control valves has a supply side fluid circuit linked to a hydraulic fluid source and a control side fluid circuit linked to a respective clutch chamber of the on-coming clutch and the off-going clutch.

15. The hydraulic clutch control system according to claim 12, wherein the clutch controller is further disposed to execute an algorithm that positively correlates hold levels to the torque experienced by the transmission during the shift of the transmission.

16. The hydraulic clutch control system according to claim 12, wherein the clutch controller is further disposed to:
calculate a modulation level command for the on-coming clutch based upon a torque experienced by the transmission during the shift of the transmission; and
apply the modulation level command for the on-coming clutch during the modulation phase.

17. A computer-readable medium having thereon computer-executable instructions for shifting between one or more transmission ratios within a transmission having a plurality of hydraulic clutches, the computer-executable instructions comprising:
instructions for determining to execute a shift of the transmission between a first ratio associated with an off-going hydraulic clutch of the transmission, which is currently engaged, and a second ratio associated with an on-coming hydraulic clutch of the transmission, which is currently disengaged;
instructions for commanding a decrease of hydraulic pressure to the off-going hydraulic clutch to begin disengagement of the off-going hydraulic clutch;
instructions for calculating a hold level command for the on-coming hydraulic clutch based upon a torque experienced by the transmission during the shift of the transmission; and
instructions for commanding, with respect to the on-coming hydraulic clutch, a sequence of clutch phases to occur at predetermined times regardless of the torque experienced by the transmission during the shift of the transmission, the sequence of clutch phases including a pulse phase, a hold phase that includes instructions for applying the calculated hold level command to the on-coming hydraulic clutch, and a modulation phase to fully engage the on-coming hydraulic clutch.

18. The computer-readable medium of claim 17, wherein the instructions for calculating a hold level command include instructions for relating hold levels to the torque experienced by the transmission during the shift of the transmission.

19. The computer-readable medium of claim 18, wherein the instructions for relating hold levels to the torque experienced by the transmission yield a substantially linear relationship therebetween.

20. The computer-readable medium of claim 17, further including: instructions for calculating a modulation level command for the on-coming hydraulic clutch based upon a torque experienced by the transmission during the shift of the transmission; and instructions for applying the modulation level command for the on-coming hydraulic clutch during the modulation phase.

* * * * *